Nov. 21, 1967  W. R. WRIGHT, JR  3,353,357
ROCKET POWERPLANT

Filed Jan. 18, 1965  2 Sheets-Sheet 1

INVENTOR.
WILLIAM R. WRIGHT JR.

United States Patent Office 3,353,357
Patented Nov. 21, 1967

3,353,357
ROCKET POWERPLANT
William R. Wright, Jr., Sparta, N.J., assignor to Thiokol Chemical Corporation, Bristol, Pa., a corporation of Pennsylvania
Filed Jan. 18, 1965, Ser. No. 426,286
8 Claims. (Cl. 60—257)

This invention relates generally to rocket powerplants and more particularly to a novel packaged liquid propellant rocket powerplant embodying novel thrust termination and thrust reversal means.

It is important and useful in programmed missile flight to be able to shut off the missile's rocket powerplant at will at a precise time and also to exert a measure of control over the decaying thrust after the powerplant is shut off. Various means have been devised to accomplish these ends but insofar as is known, these have involved added rather than reduced weight, and objectionable complexity of design and operation, or extensive and impractical remodeling of conventional powerplants.

Accordingly, the main object of the present invention is to provide an improved and novel rocket powerplant embodying thrust termination and reversal means not having the above and other objectionable characteristics of know rocket powerplants.

An important object of the present invention is to provide a novel packaged liquid propellant rocket powerplant in which termination of thrust in one direction may be effected while the decaying thrust is dissipated in the reverse direction and is useful for braking purposes.

Another important object of the present invention is to provide a novel rocket powerplant of the type described in which the decaying thrust at termination may be balanced so as to neutralize the resultant propulsive and braking thrusts.

A further important object of the present invention is to provide a novel and improved rocket powerplant embodying thrust termination and reversal means which is simple and practical in construction, and which may be readily and economically fabricated and assembled.

Other objects and advantages of the invention will become apparent during the course of the following description.

In the drawings I have shown one embodiment of the invention. In this showing:

Figure 1:
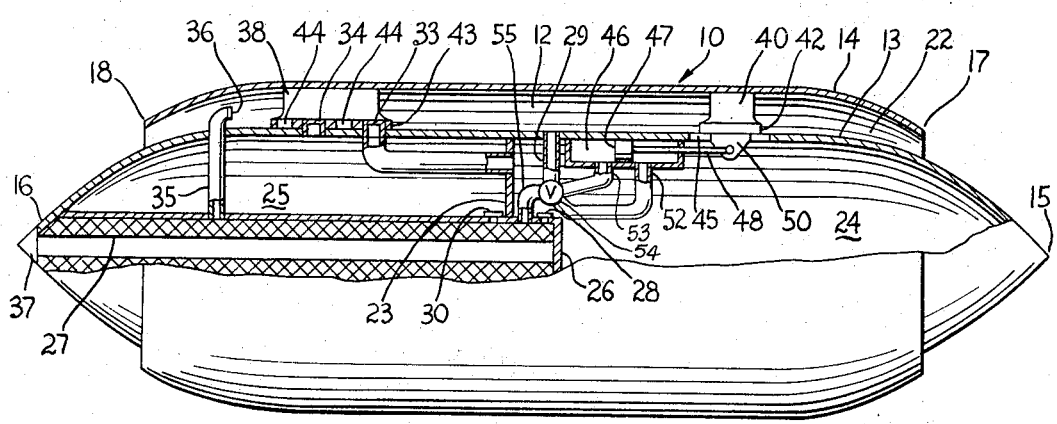
FIGURE 1 is a fragmentary, central, longitudinal sectional view of the powerplant comprising the present invention showing its combustion chamber open at both ends and in the storage position.
Figure 2:
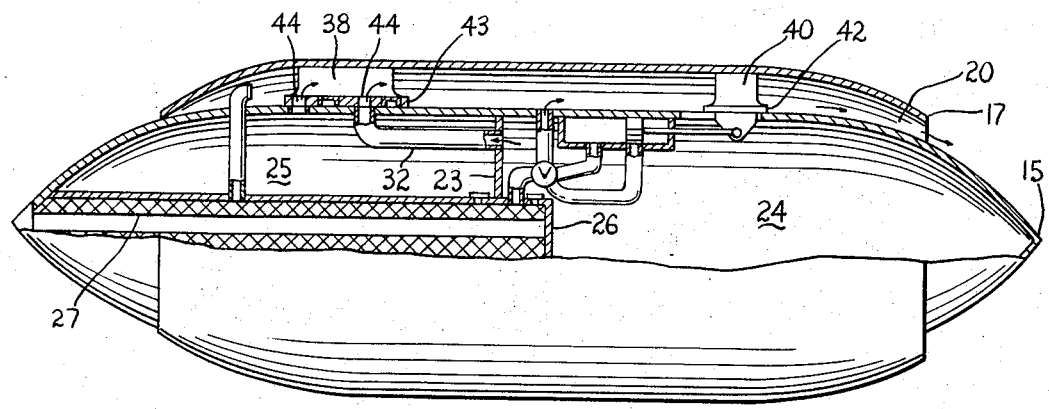
FIGURE 2 is a similar view showing the combustion chamber open at its aft end to produce thrust forwardly by exhausting combustion gases to the right in this figure.
Figure 3:
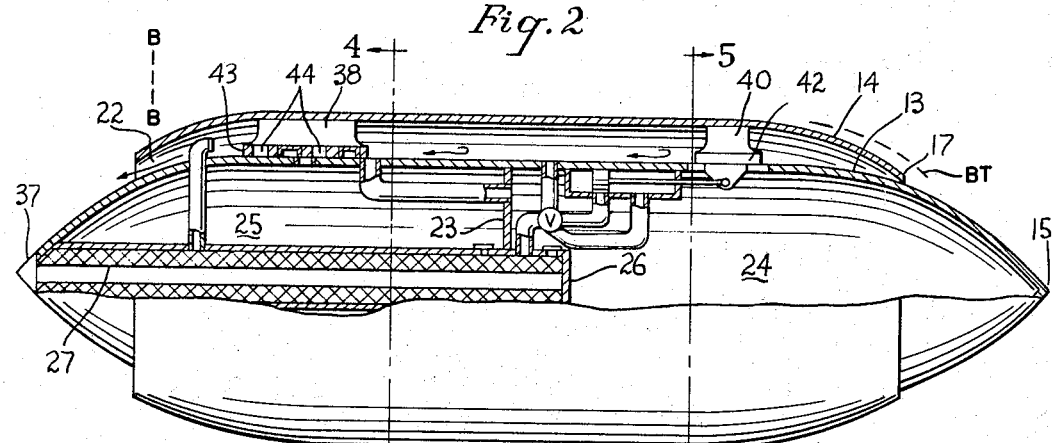
FIGURE 3 is a similar view showing the combustion chamber open at its forward end as at thrust termination to effect reverse decaying thrust.
Figure 4:
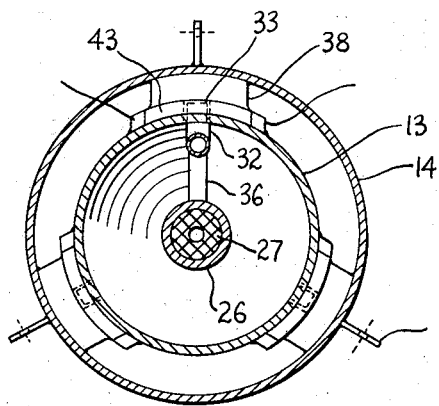
FIGURE 4 is a transverse sectional view taken at plane 4—4 in FIG. 3.
Figure 5:
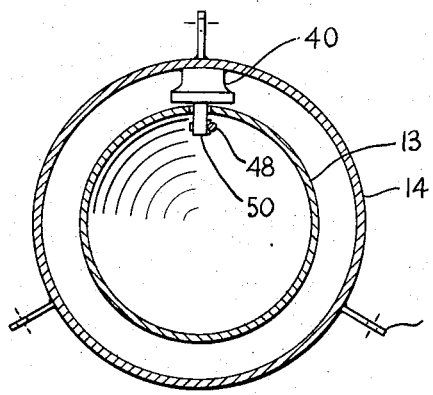
FIGURE 5 is a transverse sectional view taken at plane 5—5 in FIG. 3.

Referring now to the drawing,s numeral 10 designates the improved rocket powerplant as a whole in which an annular thrust or combustion chamber 12 is defined by a pair of spaced, concentric parallel inner and outer cylinders 13 and 14 respectively. The ends of the inner cylinder are conical and closed as at 15 and 16 whereas the ends 17 and 18 of the outer cylinder 14 are conical and open to define spike exhaust nozzles 20 and 22 with the conical cylinder ends 15 and 16, the nozzles being of smaller diameter than the cylinder 13 (FIGURES 2 and 3).

The inner cylinder 13 is provided with an intermediate bulkhead 23 which divides it into fuel and oxidizer (or vice versa) tanks 24 and 25 and the latter includes a generator chamber 26 provided with a solid propellant grain 27 adapted to be ignited at will by conventional means (not shown). Upon ignition of the solid propellant grain, the resultant pressurizing gases pass into the fuel and oxidizer tanks 24, 25 by rupturing seal or burst bands 28 and 30.

Pressurized fuel and oxidizer is admitted to the thrust chamber 12 by a conduit 32 terminating in a port sealed by a shear cup 33, and by a second port sealed by a shear cup 34 respectively. Pressurizing gases are also admitted to the chamber 12 to effect a jet mixer action therein by jet tubes 35 which are sealed by burst discs 36. The closed left end 16 of the generator 27 in the propellant tank is provided with a port which is closed by a frangible squib-destroyed plug 37.

The outer cylinder 14 is spaced from and slidably mounted on the inner cylinder 13 by fore and aft, circumferentially spaced supporting struts 38 and 40 having arcuate bases 42, 43 to conform with the surface of the inner cylinder 13. The slide 43 is provided with a pair of ports 44 which, upon aft movement with the outer cylinder 14 to shear off the shear cups 33 and 34, become aligned with the outlet ports which were sealed by those shear cups to admit fuel and oxidizer to the thrust chamber 12.

A radially disposed, longitudinally extending recess 45 of lesser width than the slide 42 of the aft struts 40, is provided in the periphery of the cylinder 13 to accommodate a double acting cylinder 46, piston 47 and piston rod 48 which is connected to a lug 50 fixed to one of the slides 43. Gas conduits 52 and 53 connect the cylinder 46 on opposite sides of the piston 47 with a four way control valve 54 which directs the flow of pressurizing gases conducted to it from the gas generator 26 by a conduit 55.

Operation

The powerplant 10 is suitably attached to the missile, etc. to be propelled thereby and when operation of the powerplant is desired, the control valve 54 is first positioned by any desired means (not shown) so as to afford communication between the generator chamber and the space in the cylinder 46 to the right of the piston 47 by means of the conduit 55, valve 54, and the conduit 53. The solid propellant grain 27 is now ignited and hot pressurizing gases flow to and act against the piston 47 to force it and the struts aft or to the right to the position of FIGURE 2 together with the outer cylinder 14.

This movement moves the shear slides 43 to shear the shear cups 33 and 34 to align the slide ports 44 therewith and thereby admitting now pressurized fuel and oxidizer to the combustion chamber 12. These propellants are jet mixed and ignited by pressurizing gases from the jet tubes 35 and it will be noted that the forward exhaust nozzle 22 is closed while the aft spike exhaust nozzle 20 is wide open and producing a maximum of forward thrust.

When thrust is to be terminated, the valve 54 is turned to its other position so that the pressurizing gases enter the space in the cylinder 46 to the right of the piston 47. This moves the piston, struts, and outer cylinder 14 to the left or forwardly to the position of FIGURE 3. This movement closes the aft or right spike exhaust nozzle 20, opens the forward exhaust nozzle 22, and the shear slides 43 cut off propellant flow from the tankage by moving the ports 44 out of alignment with the tank ports.

At this time, the frangible plug 37 is electrically destroyed to relieve the pressure of the burning propellant rain. Combustion now ceases and the residual gases giving decaying thrust pass forwardly out of the powerplant 0 through the open spike nozzle 22 as indicated to create reverse or braking thrust.

In certain applications it is not desirable that braking or reverse thrust be applied to the vehicle upon termination of thrust of the powerplant 10. Under such conditions, the control valve 54 is manipulated to shut off the flow of pressurizing gases to the piston 47 so as to move the outer cylinder 14 only partially forwardly or to the left with respect to the inner cylinder 13 or to the dash line B—B (FIGURE 3), the position of the outer cylinder end 17 being shown at BT. This enables some of the decaying thrust to pass out of the aft nozzle 20 to balance the reverse thrust passing out of the forward nozzle 22.

It is to be understood that the form of my invention herewith shown and described is to be taken as a preferred example of the same and that various changes in the shape, size and arrangement of parts may be resorted to without departure from the spirit of the invention or the scope of the subjoined claims.

I claim:

1. A rocket powerplant comprising, in combination, an inner cylinder having tapered, closed ends defining a propellant tank; an outer cylinder defining a combustion chamber with said inner cylinder and having tapered concentric open ends defining exhaust nozzles with the closed ends of said inner cylinder; and means for supplying propellant to said combustion chamber.

2. The combination recited in claim 1 wherein said cylinders are relatively movable to vary the size of the defined nozzles.

3. The combination recited in claim 1, and means connecting said cylinders for effecting relative motion therebetween.

4. The combination recited in claim 1 wherein said means comprises a propellant in said inner cylinder, a gas generator for pressurizing said propellant, ports in said cylinder communicating with said combustion chamber, and a slide movable to open said ports.

5. The combination recited in claim 4 wherein spaced struts are fixed to and support said outer cylinder on said inner cylinder, and said slide comprises the base of at least one of said struts.

6. The combination recited in claim 5, and extensible means mounted on said inner cylinder and connected to one of said struts to effect relative motion between said cylinders.

7. A rocket powerplant comprising, in combination, a pair of spaced, concentric cylinders defining a thrust chamber therebetween, said inner cylinder having closed tapered ends and comprising a propellant tank, said outer cylinder having open tapered ends defining exhaust nozzles with said closed ends, and propellant ports in said inner cylinder for delivering propellant to said thrust chamber for combustion therein.

8. The combination recited in claim 7 wherein said cylinders are relatively movable to vary the size of the nozzle defined by said tapered portions.

References Cited
UNITED STATES PATENTS

| | | | |
|---|---|---|---|
| 2,610,465 | 9/1952 | Imbert | 60—244 |
| 2,613,497 | 10/1952 | MacDonald | 60—263 |
| 2,948,112 | 8/1960 | Smith | 60—244 |
| 3,094,072 | 6/1963 | Parilla | 60—242 |

CARLTON R. CROYLE, *Primary Examiner.*

D. HART, *Assistant Examiner.*